United States Patent [19]
Suzuki et al.

[11] Patent Number: 5,261,120
[45] Date of Patent: Nov. 9, 1993

[54] METHOD AND APPARATUS FOR TRANSMITTING A SIGNAL WITH AN OFFSET WHICH FOLLOWS A RECEIVED SIGNAL

[75] Inventors: Mitsuhiro Suzuki, Tokyo; Takushi Kunihiro, Kanagawa, both of Japan

[73] Assignee: Sony Corporation, Tokyo, Japan

[21] Appl. No.: 698,660

[22] Filed: May 10, 1991

[30] Foreign Application Priority Data

May 17, 1990 [JP] Japan ................................ 2-127585

[51] Int. Cl.$^5$ ............................................. H04B 1/10
[52] U.S. Cl. ....................................... 455/63; 455/69; 455/87; 375/67
[58] Field of Search ......................... 455/69-71, 455/63, 24, 84-88, 196.1, 265; 379/58; 370/95.3; 375/67, 85

[56] References Cited

U.S. PATENT DOCUMENTS

| | | | |
|---|---|---|---|
| 2,974,222 | 3/1961 | Lawson | 455/84 |
| 3,940,695 | 2/1976 | Sickles, II | 455/69 |
| 4,019,138 | 4/1977 | Watanabe et al. | 455/69 |
| 4,430,756 | 2/1984 | Dolman et al. | 455/87 |
| 4,489,413 | 12/1984 | Richmond et al. | 455/86 |
| 4,901,368 | 2/1990 | Arnold et al. | 455/69 |
| 5,113,416 | 5/1992 | Lindell | 455/69 |

FOREIGN PATENT DOCUMENTS

| | | |
|---|---|---|
| 0355587 | 2/1990 | European Pat. Off. |
| 0412207 | 2/1991 | European Pat. Off. |
| WO91/05410 | 4/1991 | PCT Int'l Appl. |

Primary Examiner—Reinhard J. Eisenzopf
Assistant Examiner—Andrew Faile
Attorney, Agent, or Firm—Philip M. Shaw, Jr.

[57] ABSTRACT

A transmitting and receiving apparatus suitable for use as a digital cellular type mobile station. The reference reception carrier frequency and the reference transmission carrier frequency are different. Signals are transmitted and received such that an offset frequency of a received signal of an actual reception carrier frequency relative to the reference reception carrier frequency is detected and multiplied with a signal of the reference transmission carrier frequency, and the multiplied output used as the transmitted signal of an actual transmission carrier frequency which follows the actual reception carrier frequency.

10 Claims, 3 Drawing Sheets

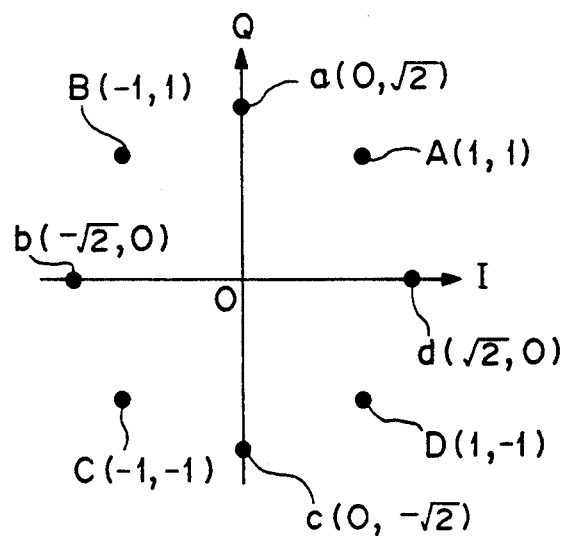
FIG. 3I
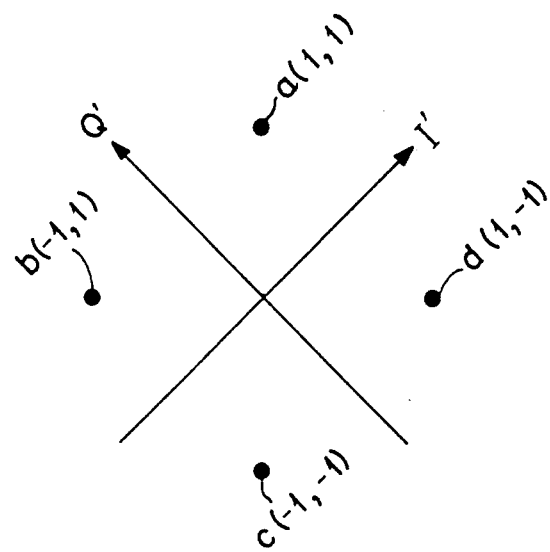
FIG. 3II
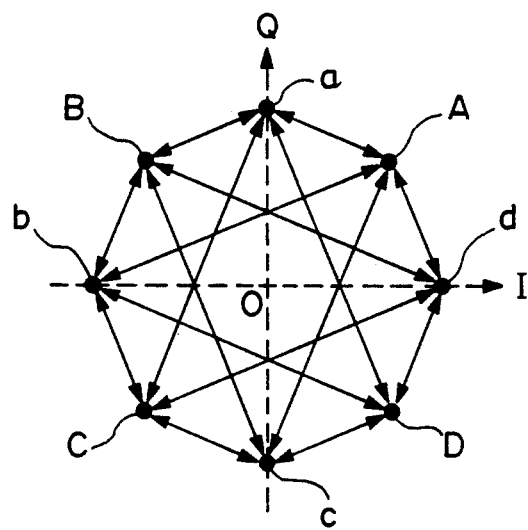
FIG. 3III

METHOD AND APPARATUS FOR TRANSMITTING A SIGNAL WITH AN OFFSET WHICH FOLLOWS A RECEIVED SIGNAL

BACKGROUND OF THE INVENTION

1. Field of the Invention

The present invention generally relates to communication systems and, more particularly, is directed to a communication system having a reference reception carrier frequency which differs from and follows a reference transmission carrier frequency.

2. Description of the Prior Art

A TDMA (time division multiple access) system is known as one type of digital cellular communication system in which a base station and a mobile station are connected via radio waves. According to this TDMA system, six receiving slots, for example, are provided for every channel of the 900 MHz band and in each mobile station an incoming signal in one of the six slots is received for a period of 20 milliseconds at intervals of 120 milliseconds. Six transmission slots are similarly provided for every channel, and in each mobile station an outgoing signal in one of the six transmission slots is similarly transmitted. A reference receiving carrier frequency and a reference transmitting carrier frequency in a single mobile station are different from each other. By way of example, a frequency 45 MHz lower than the reference receiving carrier frequency is employed as the reference transmitting carrier frequency.

When the mobile station is moved, an offset frequency occurs in the actual received carrier frequency due to the Doppler effect. Also, if the oscillation frequency of a reference oscillator in the base station, which uses a quartz crystal, is not correct, then an offset frequency will also occur. In the mobile station, the offset frequency of the transmission carrier frequency must be maintained within a band ±200 Hz from the reference transmitting carrier frequency.

For this reason, it has been proposed that the mobile station be provided with a PLL (phase locked loop) which is locked to the reception carrier frequency of the received signal to thereby produce the transmission carrier signal. However, since the received signal is a burst signal which is received for 20 milliseconds at intervals of 120 milliseconds, it is very difficult to lock the PLL to the reception carrier frequency of the received signal, as the lock frequency must be determined during a short period of time (20 milliseconds) and maintained for a period of 100 milliseconds between received signals, and the transmission offset frequency must be maintained within the band ±200 Hz from the reference transmitting carrier frequency.

OBJECTS AND SUMMARY OF THE INVENTION

Accordingly, it is an object of the present invention to provide an improved communication system in which the aforementioned shortcomings and disadvantages encountered with the prior art can be substantially eliminated.

More specifically, it is an object of the present invention to provide a communication system in which an outgoing signal has a transmission offset frequency which follows a reception offset frequency, so that the actual transmission carrier frequency of the outgoing signal follows the actual reception carrier frequency of the received signal and can be transmitted with satisfactory responsiveness and ease.

It is another object of the present invention to provide a transmitting and receiving apparatus for a digital cellular type communication system.

According to an aspect of the present invention, a transmitting and receiving apparatus for transmitting and receiving signals with a reference reception carrier frequency which differs from a reference transmission carrier frequency is comprised of a reception offset frequency detecting circuit for detecting an offset frequency of a present reception carrier frequency of a received signal relative to the reference reception carrier frequency, a multiplier for multiplying a transmission signal of the reference transmission carrier frequency with a frequency signal of a detected offset frequency, and a transmitting circuit for transmitting an output signal of the multiplier as the transmission signal of a present transmission carrier frequency.

The features and advantages described in the specification are not all inclusive, and many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIGS. 3I to 3III are diagrams showing the encoding operation of the modulating circuit of FIG. 2.

DETAILED DESCRIPTION OF THE PREFERRED EMBODIMENT

FIGS. 1 through 3III of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
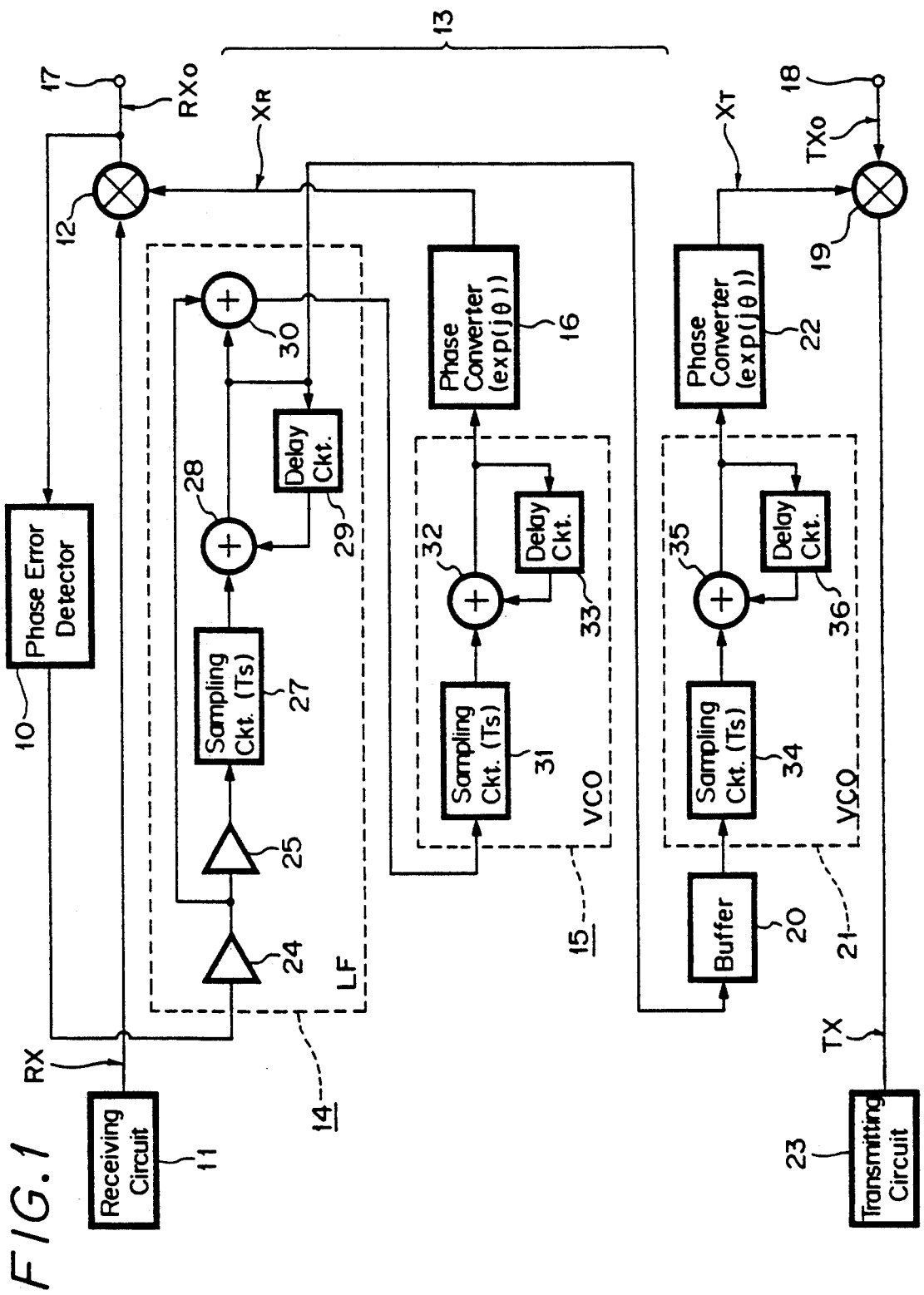
FIG. 1 is a block diagram showing an embodiment of a transmitting and receiving system according to the present invention.

FIG. 1 shows an embodiment of a transmitting and receiving system according to the present invention. In this embodiment, the present invention is applied to a TDMA digital communication system in which the base station and the mobile station are connected via radio waves. Six receiving slots, for example, are provided for every channel of the 900 MHz band, and a mobile station receives an incoming signal in one slot thereof at intervals of 120 milliseconds for a period of 20 milliseconds. Six transmission slots are similarly provided for every channel, and a mobile station transmits an outgoing signal in one slot thereof with a similar time and interval. The reference receiving carrier frequency and the reference transmitting carrier frequency in a single mobile station are different from each other.

FIG. 1 shows how the signal processing occurs in the present invention with a digital signal processor in a mobile station (i.e., a mobile telephone) in the form of a block diagram. As shown in FIG. 1, a signal RX received by a receiving circuit 11 is supplied through a multiplier 12 to a phase error detector 10. This phase error detector 10 produces only the imaginary part of the signal supplied thereto. The output of the phase error detector 10 is supplied to a loop filter (LF) 14 of a phase locked loop (PLL) 13.

The PLL 13 is composed of two parts. The first part is comprised of the loop filter 14, a VCO (voltage controlled oscillator) 15 and a phase converter [exp (j$\theta$)] 16. The second part is similarly comprised of the loop filter 14, a buffer 20, a VCO 21 and a phase converter [exp (j$\theta$)] 22. The above-described phase converters 16 and 22 generate complex sine waves corresponding to the signals supplied thereto.

The loop filter 14 is composed of a multiplier 24 for multiplying the received signal with a coefficient K, a multiplier 25 for multiplying an output of the multiplier 24 by a coefficient a (where a=K/2), a sampling circuit 27 for sampling the output of the multiplier 25 at a sampling interval Ts, an adder 28 which adds the output of the sampling circuit 27 and the output of a delay circuit 29, an adder 30 for adding the outputs of the multiplier 24 and the adder 28, and a delay circuit 29, which delays the output of the adder 28 by one sampling interval Ts and supplies the resulting delayed signal back to adder 28. The sampling circuit 27, the adder 28 and the delay circuit 29 constitute an integrator.

The VCO 15 is composed of a sampling circuit 31 for sampling the output of the loop filter 14, that is, the output of adder 30, again at a sampling interval Ts, a delay circuit 33, and an adder 32 for adding the output of the sampling circuit 31 and the output of the delay circuit 33, which delays the output of adder 32 by one sampling interval Ts and supplies the resulting delayed signal back to adder 32. Thus, the VCO 15 also constitutes an integrator.

The output of the VCO 15, that is, the output of adder 32, is then supplied to the phase converter 16, in which the phase thereof is determined. The output of phase converter 16 is supplied to multiplier 12.

The VCO 21 is supplied with a signal from the loop filter 14, that is, the output of the adder 28, through a buffer 20, and is composed of a sampling circuit 34, again having a sampling interval Ts, a delay circuit 36, and an adder 35 for adding the output of the sampling circuit 34 and the output of the delay circuit 36, which delays the output of adder 35 by one sampling interval Ts and supplies the resulting delayed signal back to adder 35, thus again constituting an integrator.

The output of the VCO 21, that is, the output of the adder 35, is then supplied to the phase converter 22, in which the phase thereof is determined, and the output of phase converter 22 is fed to a multiplier 19.

Assuming that FR represents the actual received carrier frequency of the received signal RX detected by the receiving circuit 11 (that is, the signal received by the mobile station from the signal transmitted from the base station), then the actual received carrier frequency FR is expressed as $$FR = RF_0 \pm \Delta F$$

where $RF_0$ is a reference reception carrier frequency and $\Delta F$ is an offset frequency.

The signal RX obtained from the receiving circuit 11 is supplied through the multiplier 12 and the phase error detector 10 to the loop filter 14, in which an angular frequency $\Omega$ of the offset frequency $\Delta F$ is detected, and this detected angular frequency w is supplied to the VCO 15, in which the angle $\theta$ is detected. The phase angle $\theta$ is then supplied to the phase converter 16 which then generates a frequency signal $X_R$ of the offset frequency $\Delta F$, and this frequency signal $X_R$ is supplied to the multiplier 12, where it is multiplied with the received signal RX, so that a received signal $RX_0$, having the reference received carrier frequency $FR_0$, is obtained at the output terminal 17. This received signal $RX_0$ is supplied to, and demodulated by, a demodulator (not shown) to provide an audio signal.

Another angular frequency $\omega'$ (the output of the adder 28) of an offset frequency $\Delta F'$ detected by the integrator formed of the elements 27, 28 and 29 within the loop filter 14 is supplied to the VCO 21, and an angle $\theta'$ is detected. This detected angle $\theta'$ is supplied to the phase converter 22 which generates a frequency signal $X_T$ of the offset frequency $\Delta F'$. This frequency signal $X_T$ is supplied to multiplier 19, where it is multiplied with the transmission signal $TX_0$, supplied from a terminal 18 and having a reference transmission carrier frequency $FT_0$, to provide a transmission signal TX having an actual transmission carrier frequency FT. This transmission signal TX is transmitted to the base station from a transmitter 23.

Assuming that FT represents the actual transmission carrier frequency of the transmission signal TX, then FT is expressed as $$FT = FT_0 \mp \Delta F$$

where $FT_0$ is the reference transmission carrier frequency.

The angular frequency $\omega$ supplied to the VCO 15 must follow the received signal and must thus be the output of the adder 30. However, the angular frequency $\omega'$ supplied to the VCO 21 need not follow the received signal so that the signal-to-noise (S/N) ratio can be improved by utilizing the output of the adder 28, which has the low noise of the received signal, before additional noise is added by the adder 30. The difference between the angular frequencies $\omega$ and $\omega'$ is negligible in comparison to the difference between the transmission and reception frequencies.

According to the above communication system, when the reference reception carrier frequency $FR_0$ and the reference transmission carrier frequency $FT_0$ are different, the offset frequency $\Delta F'$ of the actual reception carrier frequency FR of the received signal RX relative to the reference reception carrier frequency $FR_0$ is detected by the second part of the PLL 13 (loop filter 14, buffer 20, VCO 21, and phase converter 22) and the frequency signal $X_T$ of the thus detected offset frequency $\Delta F'$ is multiplied with the transmission signal $TX_0$, which has the reference transmission carrier frequency $FT_0$, by the multiplier 19 to produce the transmission signal TX which is transmitted with an actual transmission carrier frequency FT. Thus, the transmission signal TX has an actual transmission carrier frequency FT with the same transmission offset frequency $\Delta F'$ as the reception offset frequency $\Delta F'$, and can be transmitted with excellent responsiveness and ease.

Similarly, the offset frequency $\Delta F$ of the actual reception carrier frequency FR of the received signal RX relative to the reference reception carrier frequency $FR_0$ is detected by the first part of the PLL 13 (loop filter 14, VCO 15, and phase converter 16) and the frequency signal $X_R$ of the thus detected offset frequency ΔF is provided and then multiplied with the transmission signal RX of the actual reception carrier frequency FR by the multiplier 12 to produce the reception signal $RX_0$ of the reference reception carrier frequency $FR_0$. Thus, even when the actual reception carrier frequency FR of reception signal RX contains the offset frequency ΔF, the audio signal can be demodulated with the same demodulation characteristic as that of a reception signal $RX_0$ of the reference reception carrier frequency $FR_0$ by the demodulating circuit.

Figure 2:
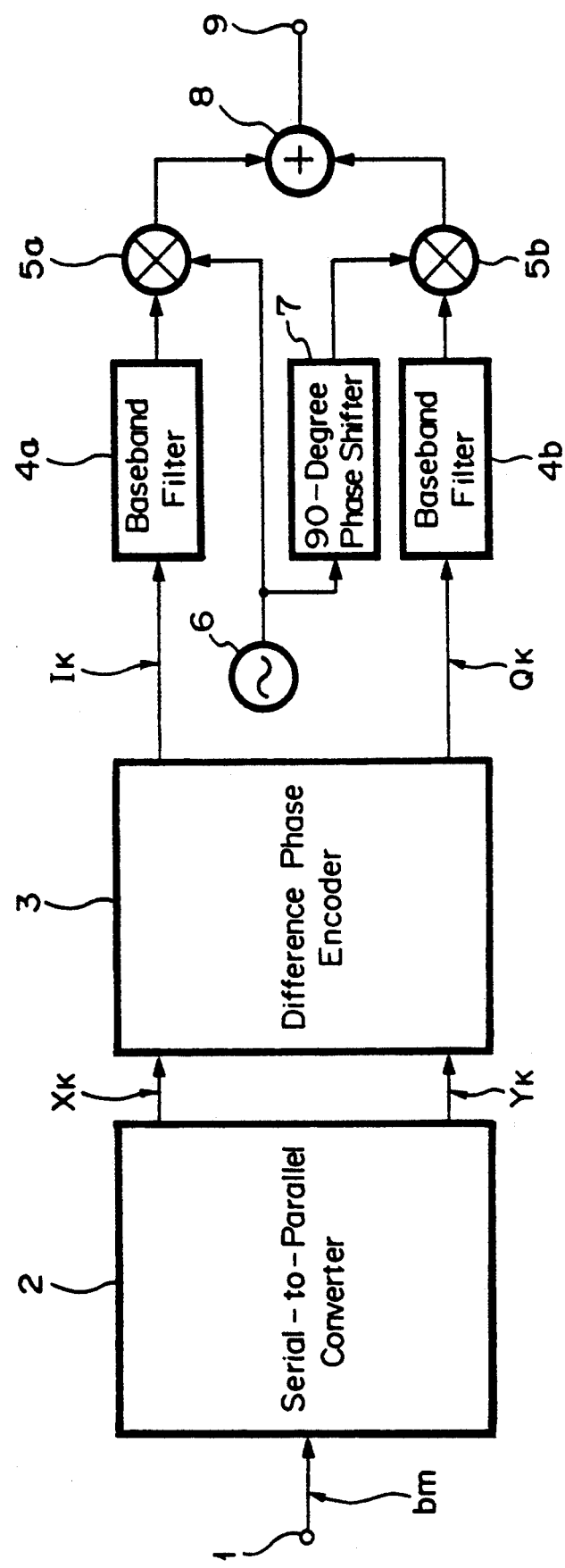
FIG. 2 is a block diagram showing a modulating circuit used in the present invention.

This embodiment uses a π/4 shifted QPSK (quadrature phase shift keying) modulation circuit which is shown in FIG. 2. However, the present invention is not limited to the above modulating circuit and can be applied to either an analog communication system or a digital communication system.

As shown in FIG. 2, a serial digital audio signal bm from an input terminal 1 is supplied to a serial-to-parallel converter 2, where it is converted to parallel digital signals $X_K$ and $Y_K$ of 2 bits and then supplied to a differential phase encoder 3.

The encoding of the differential phase encoder 3 will be described with reference to FIGS. 3I to 3III.

As shown in FIG. 3I, points A (1, 1), B (−1, 1), C (−1, −1) and D (1, −1) on the perpendicular I axis (real axis) and Q axis (imaginary axis) are determined. Then, as shown in FIG. 3II, points a (1, 1), b (−1, 1), c (−1, −1) and d (1, −1) on the perpendicular I' axis (real axis) and Q' axis (imaginary axis), which result from rotating the orthogonal I axis and Q axis coordinates by 45 degrees (π/4), are also determined.

When the I' axis and Q' axis coordinates are moved in parallel and superimposed on the I axis and Q axis coordinates so that their origins coincide with each other, the coordinates of the points a, b, c, and d on the I' axis and Q' axis coordinates on the I axis and Q axis are presented as a (0, $\sqrt{2}$), b (−$\sqrt{2}$, 0), c (0, −$\sqrt{2}$) and d ($\sqrt{2}$, 0).

The encoded outputs $I_K$ and $Q_K$ of the encoder 3 are then moved from any one of the points A through D on the I axis and Q axis coordinates to any one of the points a through d in accordance with the outputs $X_K$ and $Y_K$ of 2 bits from the serial-to-parallel converter circuit 2 and moved from any one of the points a to d to any one of the points A to D in response to the outputs $X_K$ and $Y_K$ of 2 bits of the serial-to-parallel converter circuit 2. The movements between any one of the points A to D and any one of the points a to d are represented in FIG. 3III. Such movements never pass through the origin 0.

The movements between any one of the points A to D on the I axis and Q axis coordinates and any one of the points a to d on the I' axis and Q' axis coordinates can be expressed by the change ΔΦ of the angles of straight lines connecting the respective points and the origin 0.

Accordingly, a relation between the outputs $X_K$, $Y_K$ and the difference ΔΦ will be represented on the following truth table.

| $X_K$ | $Y_K$ | ΔΦ |
|---|---|---|
| 1 | 1 | −3π/4 |
| 0 | 1 | 3π/4 |
| 0 | 0 | π/4 |
| 1 | 0 | −π/4 |

The encoded outputs $I_K$ and $Q_K$ are respectively supplied through baseband filters 4a and 4b to modulators (multipliers) 5a and 5b, where a carrier from a carrier generator 6 and a carrier whose phase is shifted by 90 degrees from the former carrier by a 90 degree phase shifter 7 are modulated (multiplied) with the respective encoded outputs. The outputs are then added by an adder 8 and output from an output terminal 9 as a digital modulated signal.

Thus, the present invention as described above is a communication system in which the reference reception carrier frequency and the reference transmission carrier frequency are different. An offset frequency, which is the difference in the actual reception carrier frequency of the received signal relative to the reference reception carrier frequency, is detected. The frequency signal of the thus detected offset frequency is multiplied with the transmission signal of the reference transmission carrier frequency to obtain a transmission signal of an actual transmission carrier frequency which has an offset frequency relative to the reference transmission carrier frequency which follows the offset frequency of the received signal. The transmission signal of can then be transmitted with satisfactory responsiveness and with ease.

From the above description, it will be apparent that the invention disclosed herein provides a novel and advantageous apparatus for a mobile communication system.

The foregoing discussion discloses and describes merely exemplary methods and embodiments of the present invention. As will be understood by those familiar with the art, the invention may be embodied in other specific forms without departing from the spirit or essential characteristics thereof. For example, different specific circuits could be used, in either the analog or digital domain. Accordingly, the disclosure of the present invention is intended to be illustrative, but not limiting, of the scope of the invention, which is set forth in the following claims.

What is claimed is:

1. A transmitting and receiving apparatus for receiving a broadcast signal of an actual reception carrier frequency and transmitting a signal of an actual transmission carrier frequency, comprising:

receiving means for receiving the broadcast signal;

reference frequency means for providing a reference reception carrier frequency and a reference transmission carrier frequency which are different from each other;

reception offset frequency detecting means in the form of a loop filter, and including an integrator, for detecting a reception offset frequency which is the difference between the actual reception carrier frequency of the received signal and the reference reception carrier frequency, and outputting from the integrator a corresponding reception offset frequency signal;

transmission signal generating means for generating a first transmission signal having the reference transmission carrier frequency;

multiplying means for multiplying the first transmission signal by the reception offset frequency signal to generate a second transmission signal with the actual transmission carrier frequency; and transmitting means for transmitting the second transmission signal.

2. A transmitting and receiving apparatus according to claim 1, wherein the reference frequency means further comprises means for setting the reference reception carrier frequency and the reference transmission carrier frequency in a predetermined relationship.

3. A transmitting and receiving apparatus according to claim 2, wherein the receiving means further comprises means for receiving the broadcast signal on a time-division basis, and the transmitting means further comprises means for transmitting the second signal on a time-division basis.

4. A transmitting and receiving apparatus according to claim 2 further comprising a $\pi/4$ shifted QPSK (quadrature phase shift keying) modulation circuit for modulating the transmission signal and wherein the receiving means receives the broadcast signal which has been $\pi/4$ shifted QPSK modulated.

5. A transmitting and receiving apparatus for transmitting and receiving signals under the condition that a reference reception carrier frequency and a reference transmission carrier frequency are different from each other, comprising:
  (a) reception offset frequency detecting means for detecting as a first reception offset frequency a difference between a frequency of a received signal and the reference reception carrier frequency and outputting a first reception offset frequency signal which does not follow the frequency of the received signal;
  (c) a first multiplier supplied with the first offset frequency signal for multiplying a transmission signal of the reference transmission carrier frequency with the first reception offset frequency signal; and
  (c) transmitting means for transmitting an output signal of the multiplier as the transmission signal.

6. A transmitting and receiving apparatus according to claim 5, wherein:
the reception offset frequency detecting means detects as a second reception offset frequency a difference between the frequency of the received signal the reference reception carrier frequency and outputs a second reception offset frequency signal which does follow the frequency of the received signal; and further including
a second multiplier supplied with the second reception offset frequency signal for multiplying the received signal with the second reception offset frequency signal to thereby generate as an output a received signal having the reception carrier frequency.

7. A transmitting and receiving apparatus according to claim 5, wherein the reception offset frequency detecting means is formed of a loop filter, a first voltage controlled oscillator, and a first phase converter.

8. A transmitting and receiving apparatus according to claim 6, wherein the reception offset frequency detecting means is formed of a loop filter, a first voltage controlled oscillator, a first phase converter, a second voltage controlled oscillator, and a second phase converter.

9. A transmitting and receiving apparatus according to claim 2, wherein the loop filter includes an integrator and an output signal of the integrator is supplied to the second voltage controlled oscillator which outputs a signal to the second phase comparator which outputs the first reception offset frequency signal.

10. A transmitting and receiving apparatus according to claim 8 further comprising phase error detector means supplied with the output from the second multiplier and outputting to an input of the loop filter only an imaginary part of the output of the second multiplier.

* * * * *